United States Patent
Liu et al.

(10) Patent No.: US 10,394,340 B2
(45) Date of Patent: *Aug. 27, 2019

(54) BACKLIT ILLUMINATION OF ELECTRONICS

(71) Applicant: Microsoft Technology Licensing, LLC, Redmond, WA (US)

(72) Inventors: Tao Liu, Redmond, WA (US); John Jacob Nelson, Redmond, WA (US); Jingyu Zou, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/243,202

(22) Filed: Jan. 9, 2019

(65) Prior Publication Data

US 2019/0146593 A1 May 16, 2019

Related U.S. Application Data

(63) Continuation of application No. 14/611,990, filed on Feb. 2, 2015, now Pat. No. 10,216,285.

(51) Int. Cl.
| | |
|---|---|
| *H01H 13/83* | (2006.01) |
| *G06F 3/02* | (2006.01) |
| *F21V 8/00* | (2006.01) |
| *G06F 1/16* | (2006.01) |
| *H04M 1/22* | (2006.01) |

(52) U.S. Cl.
CPC .......... *G06F 3/0202* (2013.01); *G02B 6/0088* (2013.01); *G06F 1/1669* (2013.01); *H01H 13/83* (2013.01); *H01H 2211/004* (2013.01); *H01H 2219/044* (2013.01); *H01H 2219/062* (2013.01); *H04M 1/22* (2013.01)

(58) Field of Classification Search
None
See application file for complete search history.

(56) References Cited

U.S. PATENT DOCUMENTS

| | | | | |
|---|---|---|---|---|
| 7,534,001 B2 * | 5/2009 | Liu | ...................... | G02B 6/0016 362/23.03 |
| 8,186,866 B2 * | 5/2012 | Liu | ...................... | H01H 13/705 200/313 |
| 9,366,412 B2 * | 6/2016 | Kim | ......................... | F21V 9/08 |

(Continued)

*Primary Examiner* — Chanh D Nguyen
*Assistant Examiner* — Karin Kiyabu
(74) *Attorney, Agent, or Firm* — Ray Quinney & Nebeker P.C.; Paul N. Taylor (57) ABSTRACT

A backlit device includes an outer layer, an adhesive layer, and a light guide configured to transmit light from a light source. The adhesive layer is positioned between the outer layer and the light guide. The outer layer includes a plurality of outer layer segments and at least one opening positioned between the outer layer segments where light from the light guide can pass through and provide backlighting. The adhesive layer includes a plurality of adhesive material segments. Each adhesive material segment is individually positioned between an outer layer segment and the light guide such that the perimeter of an outer layer segment surrounds the perimeter of the respective adhesive material segment. Through this arrangement, the adhesive material segments do not divert or block light passing through the opening in the outer layer.

20 Claims, 5 Drawing Sheets

(56) References Cited

U.S. PATENT DOCUMENTS

| | | | | |
|---|---|---|---|---|
| 9,411,092 B2* | 8/2016 | Tai | ............... | G02B 6/0036 |
| 2008/0218991 A1* | 9/2008 | Liu | ............... | G02B 6/0016 |
| | | | | 362/23.03 |
| 2009/0173713 A1* | 7/2009 | Liu | ............... | H01H 13/705 |
| | | | | 216/20 |
| 2009/0175440 A1* | 7/2009 | Liu | ............... | H01H 13/705 |
| | | | | 379/433.07 |
| 2012/0256844 A1* | 10/2012 | Takeda | ............ | G06F 3/0202 |
| | | | | 345/170 |
| 2014/0091857 A1* | 4/2014 | Bernstein | ......... | H01H 13/14 |
| | | | | 327/517 |
| 2014/0146562 A1* | 5/2014 | Ishida | ............ | G02B 6/0038 |
| | | | | 362/606 |
| 2015/0084865 A1* | 3/2015 | Shaw | ............... | G06F 3/023 |
| | | | | 345/158 |
| 2015/0109546 A1* | 4/2015 | Tai | ............... | G02B 6/0036 |
| | | | | 349/12 |
| 2016/0049265 A1* | 2/2016 | Bernstein | ......... | H01H 13/14 |
| | | | | 200/341 |
| 2016/0196935 A1* | 7/2016 | Bernstein | ......... | H01H 13/14 |
| | | | | 200/344 |
| 2016/0313832 A1* | 10/2016 | Shaw | ............... | G06F 3/023 |
| 2017/0123130 A1* | 5/2017 | Chang | ............ | G02B 6/002 |
| 2018/0041672 A1* | 2/2018 | Yu | ............... | G02B 6/0055 |
| 2018/0106958 A1* | 4/2018 | Zeng | ............... | G02B 6/0051 |

\* cited by examiner

BACKLIT ILLUMINATION OF ELECTRONICS

CROSS REFERENCE TO RELATED APPLICATIONS

This application is a continuation of U.S. patent application Ser. No. 14/611,990, filed Feb. 2, 2015, which is hereby incorporated by reference in its entirety.

BACKGROUND

Mobile computing devices have been developed to increase the functionality that is made available to users in a mobile setting. For example, a user may interact with a mobile phone, tablet computer, or other mobile computing device to check email, surf the web, compose texts, and interact with applications.

For example, some mobile computing devices provide a virtual keyboard that is accessible using touchscreen functionality of the device. In other examples, the mobile computing device includes a physical keyboard. Such physical keyboards may be backlit for use in low light scenarios. In yet other examples, the mobile computing device includes both physical and virtual keyboard functionalities.

SUMMARY

Device backlighting techniques and mechanisms are described herein. In one or more examples, a device includes an outer layer having a plurality of outer layer segments and at least one opening positioned between the outer layer segments where light from a light guide can pass through. Each outer layer segment of the plurality of outer layer segments includes an outer layer segment perimeter. The device further includes a first adhesive layer including a plurality of adhesive material segments, each adhesive material segment having an adhesive material segment perimeter. The device further includes a light guide. In the device, the first adhesive layer is positioned between the outer layer and the light guide. Additionally, each adhesive material segment of the plurality of adhesive material segments is positioned between an outer layer segment and the light guide such that the outer layer segment perimeter of the respective outer layer segment surrounds the adhesive material segment perimeter of the respective adhesive material segment as viewed in a direction from the outer layer to the light guide perpendicular to a surface of the outer layer.

In one or more examples, a device includes an outer layer having a plurality of outer layer segments and at least one opening positioned between the outer layer segments. The device further includes an intermediate layer having at least one light filter segment. The device further includes a light guide. In the device, the intermediate layer is positioned between the light guide and the outer layer. Additionally, the light filter segment is positioned along an axis between the opening and the light guide, the axis being perpendicular to a surface of the outer layer. Furthermore, the light filter segment has a thinness configured to provide a brightness in the opening in the outer layer as observed at the surface of the outer layer in the direction from the outer layer to the light guide perpendicular to the surface.

In one or more examples, an apparatus is provided. The apparatus includes a backlit device and an input/output module having a display device. The input/output module is configured to process an input from the backlit device and render an output on the display device. Additionally, the backlit device includes an outer layer having a plurality of outer layer input keys and at least one opening positioned between the outer layer input keys, where light from a light guide can pass through, and where each outer layer input key of the plurality of outer layer input keys includes an outer layer segment perimeter. The backlit device also includes an adhesive layer having a plurality of adhesive material segments, where each adhesive material segment includes an adhesive material segment perimeter. The backlit device further includes a light guide and a sensor assembly including a plurality of sensors. In the backlit device, the adhesive layer is positioned between the outer layer and the light guide, and the light guide is positioned between the adhesive layer and the sensor assembly. Additionally, each adhesive material segment of the plurality of adhesive material segments is positioned between an outer layer segment and the light guide such that the outer layer segment perimeter of the respective outer layer segment surrounds the adhesive material segment perimeter of the respective adhesive material segment as viewed in a direction from the outer layer to the light guide perpendicular to a surface of the outer layer.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWING FIGURES

For a more complete understanding of the disclosure, reference is made to the following detailed description and accompanying drawing figures, in which like reference numerals may be used to identify like elements in the figures.

While the disclosed systems and methods may be implemented as embodiments in various forms, specific embodiments are illustrated in the drawings (and are hereafter described), with the understanding that the disclosure is intended to be illustrative, and is not intended to limit the invention to the specific embodiments described and illustrated herein.

DETAILED DESCRIPTION

Backlit devices, such as backlit keyboards, are described herein. Such devices include an outer layer and an internal light guide, where the light guide emits light through portions of the outer layer, therein providing backlighting of the outer layer. Improvements to such backlit devices, as described herein, may include a reduction in the variability of the brightness of the emitted backlight. The improved backlit device may also, or alternatively, include a reduction or elimination of undesired backlighting from designated areas of the device.

These properties of the improved backlit device are developed through construction of a multi-layered device having the outer layer and the light guide. In certain examples, an improved backlit device is provided through the use of an intermediate adhesive layer having adhesive segments and/or light filter segments. The adhesive segments may be positioned in certain locations beneath outer layer segments of the outer layer. The positioning of the adhesive segments is configured to provide adhesion between adjacent layers while reducing the variability in the uniformity of emitted light through the outer layer. The light filter segments may be positioned to filter light through to the outer layer in designated locations.

The backlit device is also, or alternatively, improved through use of one or more dark (e.g., black) intermediate adhesive layers. A dark adhesive layer may be provided to block unwanted light from being emitted in designated areas.

Certain embodiments having one or more of these properties are described herein.

In a first embodiment ("A"), adhesive material segments are positioned between an outer layer having outer layer segments and a light guide. Each adhesive material segment is positioned between an outer layer segment and the light guide such that the respective perimeter of the outer layer segment surrounds the perimeter of the adhesive material segment as viewed in a direction from the outer layer to the light guide.

In a second embodiment ("B"), the light guide layer may be connected to a sensor assembly with adhesive material in designated locations, the sensor assembly being configured to detect proximity of an object to initiate an input.

In a third embodiment ("C"), light filter segments between the light guide and outer layer are configured to be as thin as possible to provide a desired brightness and reduce unwanted light emission through the sides of the light filter.

In a fourth embodiment ("D"), an adhesive layer, provided to adhere two adjacent layers together, is made out of a dark color (e.g., black) polymer. The dark adhesive layer may be a black heat activated film layer positioned between an outer layer of the backlit device and the light guide to reduce or eliminate light from being emitted in selected locations of the backlit device (e.g., a track pad of a keyboard).

In a fifth embodiment ("E"), adhesive layers having dark colors (e.g., black) may be positioned between (1) the light guide and sensor assembly and/or (2) the sensor assembly and an additional dark adhesive layer to reduce or eliminate the emission of light out of the backlit device in the direction from the outer layer to the light guide.

These five embodiments described above may be combined with each other to provide an improved backlit device. For instance, the following permutations of embodiments A through E are possible: A+B; A+C; A+D; A+E; B+C; B+D; B+E; C+D; C+E; D+E; A+B+C; A+B+D; A+B+E; A+C+D; A+C+E; A+D+E; B+C+D; B+C+E; B+D+E; C+D+E; A+B+C+D; A+B+C+E; A+C+D+E; B+C+D+E; or A+B+C+D+E.

In one example, a backlit device is configured for use as a mobile computing device (i.e., a device capable of being transported from one place to another). The backlit device may be a tablet, mobile phone, music device, handheld gaming device, navigation device, tablet computer, wearable device, or other device.

In another example, the backlit device is configured for use as a stationary computing device (i.e., a device that remains fixed in one particular location for use). Non-limiting examples of stationary computing devices include computing devices on home appliances such as refrigerators, dishwashers, microwaves, ranges or ovens, furnaces, washers, and dryers. Other non-limiting examples of stationary computing devices include data entry pads such as a thermostat or a keypad lock on a door to a dwelling. Additional examples include televisions, home theater devices (e.g., speakers, receivers, and amplifiers), computer monitors, printers, or scanners.

In some examples, the backlit device may be configured for use with a computing device. For example, the backlit device may be configured as an input device that may be wirelessly or physically in communication with the computing device. In one example, the backlit device is a keyboard integrated into a cover that may be attached to and removed from the mobile computing device. The backlit device may also be a track-pad, game controller, or an application-specific input device. The backlit device may include a light guide configured to provide backlighting to functional indicators, such as text characters or symbols, on a surface of the backlit device.

In yet another examples, the backlit device may be configured as a wearable electronic device, wherein the device may be worn on or attached to a person's body or clothing. The wearable device may be attached to a person's shirt or jacket; worn on a person's wrist, ankle, waist, or head; or worn over their eyes or ears. Such wearable devices may include a watch, heart-rate monitor, activity tracker, or a head-mounted display.

In the following discussion, example environments are described that may employ the techniques described herein. Examples of the layers of the multi-layer backlit device that are usable in the example environments are described. The examples of the layers of the backlit device may be performed in the example environments as well as other environments. Consequently, use of the example layers is not limited to the example environments and the example environments are not limited to use of the example layers.

Computing Device Overview

Figure 1:
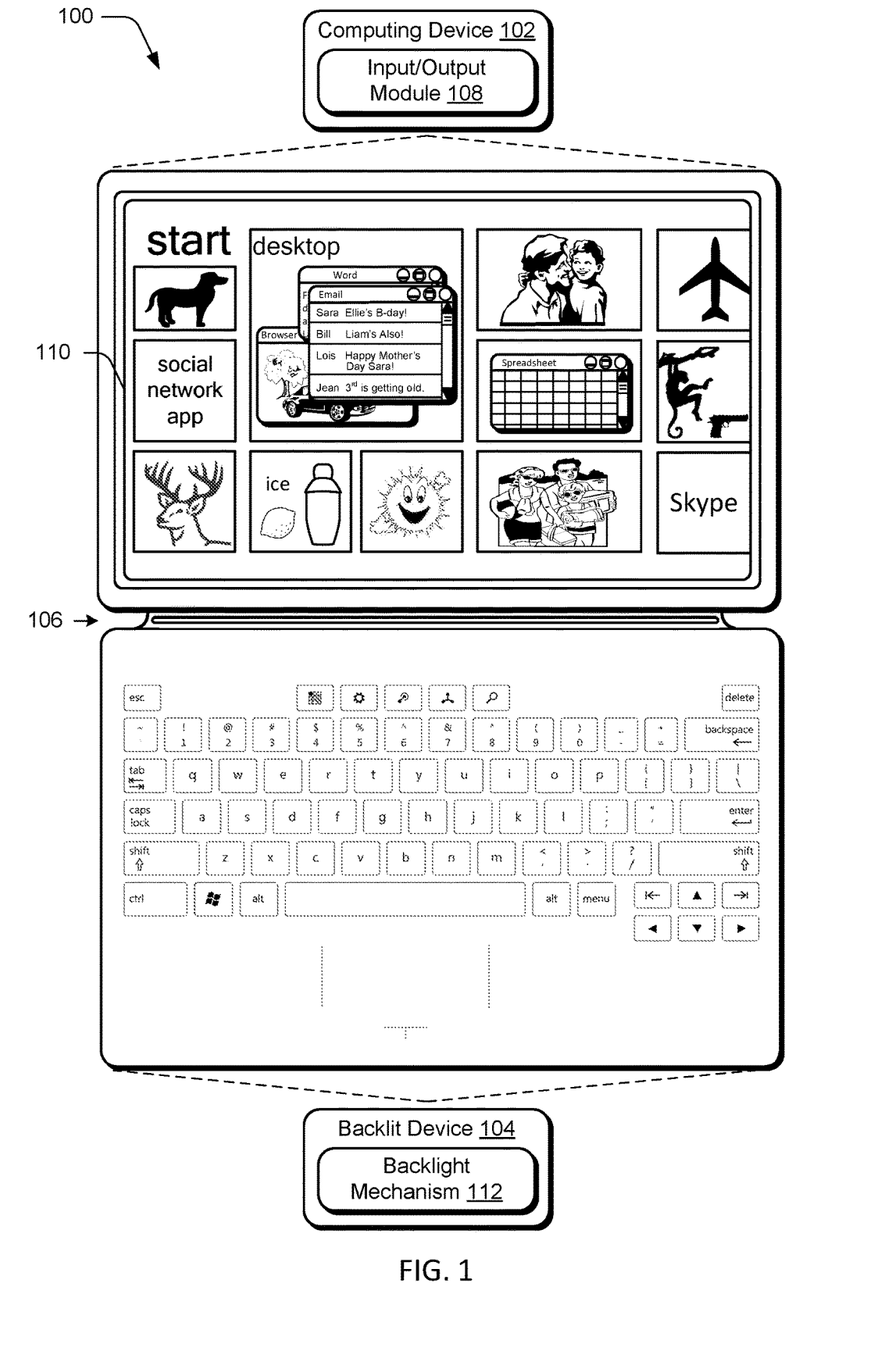
FIG. 1 is an illustration of an environment in an example implementation that is operable to employ the backlight techniques described herein.

FIG. 1 is an illustration of an environment 100 in an example implementation that is operable to employ the techniques described herein. The illustrated environment 100 includes an example of a computing device 102 that is communicatively coupled to a backlit device 104 via a hinge 106. The computing device 102 may be configured to have a range of processing powers and memory capacities. The computing device 102 may also include software that causes the computing device 102 to perform one or more operations.

The computing device 102, for instance, is illustrated as including an input/output module 108. The input/output module 108 is representative of functionality relating to processing of inputs and rendering outputs of the computing device 102. A variety of different inputs may be processed by the input/output module 108, such as inputs relating to functions that correspond to keys of the backlit device 104, keys of a virtual keyboard displayed by the display device 110 to identify gestures and cause operations to be performed that correspond to the gestures that may be recognized through the backlit device 104 and/or touchscreen functionality of the display device 110, and so forth. Thus, the input/output module 108 may support a variety of different input techniques.

In the illustrated example, the backlit device 104 is configured as having an input portion that includes a keyboard having a QWERTY arrangement of keys and track pad although other arrangements of keys are also contemplated. Further, other non-conventional configurations are also contemplated, such as a game controller, configuration to mimic a musical instrument, and so forth. Thus, the backlit device 104 and keys incorporated by the backlit device 104 may assume a variety of different configurations to support a variety of different functionalities.

As previously described, the backlit device 104 is physically and communicatively coupled to the computing device 102 in this example through use of a hinge 106. The hinge 106 may be flexible in that rotational movement supported by the hinge is achieved through flexing (e.g., bending) of the material forming the hinge. Alternatively, mechanical rotation may be supported by a pin, for example, by using a barrel hinge. Further, the flexible rotation may be configured to support movement in one or more directions (e.g., vertically in the figure) yet restrict movement in other directions, such as lateral movement of the backlit device 104 in relation to the computing device 102. This may be used to support consistent alignment of the backlit device 104 in relation to the computing device 102, such as to align sensors used to change power states, application states, and so on.

The hinge 106, for instance, may be formed using one or more layers of fabric and include conductors formed as flexible traces to communicatively couple the backlit device 104 to the computing device 102 and vice versa. This communication, for instance, may be used to communicate a result of a key press to the computing device 102, receive power from the computing device, perform authentication, provide supplemental power to the computing device 102, and so on.

The backlit device 104 is also illustrated as including a backlight mechanism 112. The backlight mechanism 112 is representative of functionality that is configured to emit light from a surface of the backlit device 104, such as to illuminate indications of inputs (e.g., letters of the keyboard as well as a border for the keys, track pad, and so on). In this way, the indications may be viewed in low light conditions. The backlight mechanism 112 may be implemented in a variety of ways. For example, the backlight mechanism may include at least one light source in communication with a light guide in the form of a layer (i.e., a light guide layer), wherein the light source emits light that extends along the length of the light guide layer, and at specific locations along the light guide layer, the light is redirected toward the outer layer to provide a backlit surface.

Figure 2:
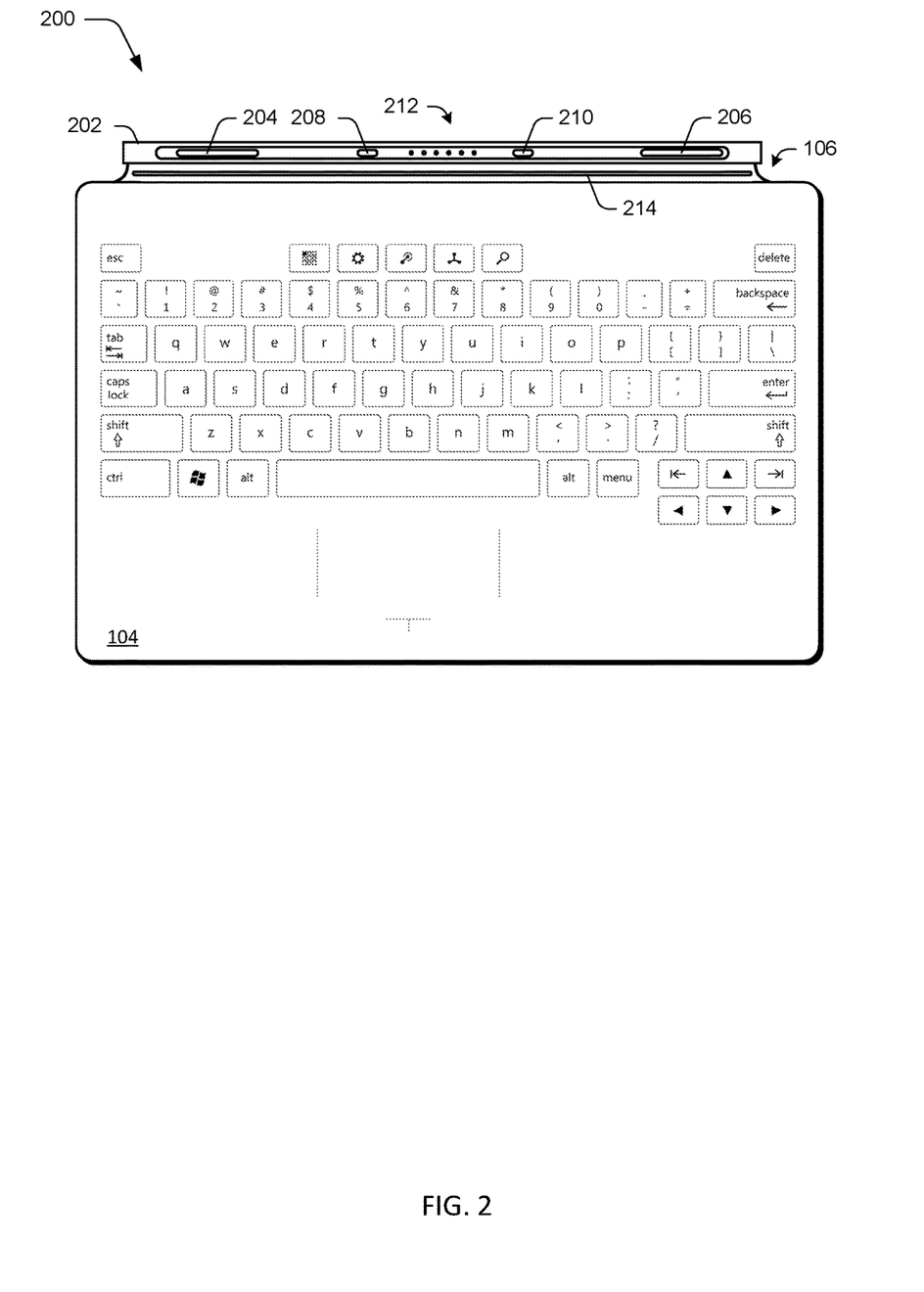
FIG. 2 depicts an example implementation of a backlit device of FIG. 1 as showing a hinge in greater detail.

FIG. 2 depicts an example implementation 200 of the backlit device 104 of FIG. 1 as showing the hinge 106 in greater detail. In this example, a connection portion 202 of the backlit device is shown that is configured to provide a communicative and physical connection between the backlit device 104 and the computing device 102. The connection portion 202 as illustrated has a height and cross section configured to be received in a channel in the housing of the computing device 102, although this arrangement may also be reversed without departing from the spirit and scope thereof.

The connection portion 202 is flexibly connected to a portion of the backlit device 104 that includes the keys through use of the hinge 106. Thus, when the connection portion 202 is physically connected to the computing device 102 the combination of the connection portion 202 and the hinge 106 supports movement of the backlit device 104 in relation to the computing device 102 that is similar to a hinge of a book.

Through this rotational movement, a variety of different orientations of the backlit device 104 in relation to the computing device 102 may be supported. For example, rotational movement may be supported by the hinge 106 such that the backlit device 104 may be placed against the display device 110 of the computing device 102 and thereby act as a cover. Thus, the backlit device 104 may act to protect the display device 110 of the computing device 102 from harm.

The connection portion 202 may be secured to the computing device in a variety of ways, an example of which is illustrated as including magnetic coupling devices 204, 206 (e.g., flux fountains), mechanical coupling protrusions 208, 210, and a plurality of communication contacts 212. The magnetic coupling devices 204, 206 are configured to magnetically couple to complementary magnetic coupling devices of the computing device 102 through use of one or more magnets. In this way, the backlit device 104 may be physically secured to the computing device 102 through use of magnetic attraction.

Alternatively or additionally, the connection portion 202 may include mechanical coupling protrusions 208, 210 to form a mechanical physical connection between the backlit device 104 and the computing device 102. In other alternatives, the hinge may include an inwardly curved surface that attracts magnetically to and couples with an outwardly curved edge of a handheld computing device.

Construction of Backlit Device

Figure 3:
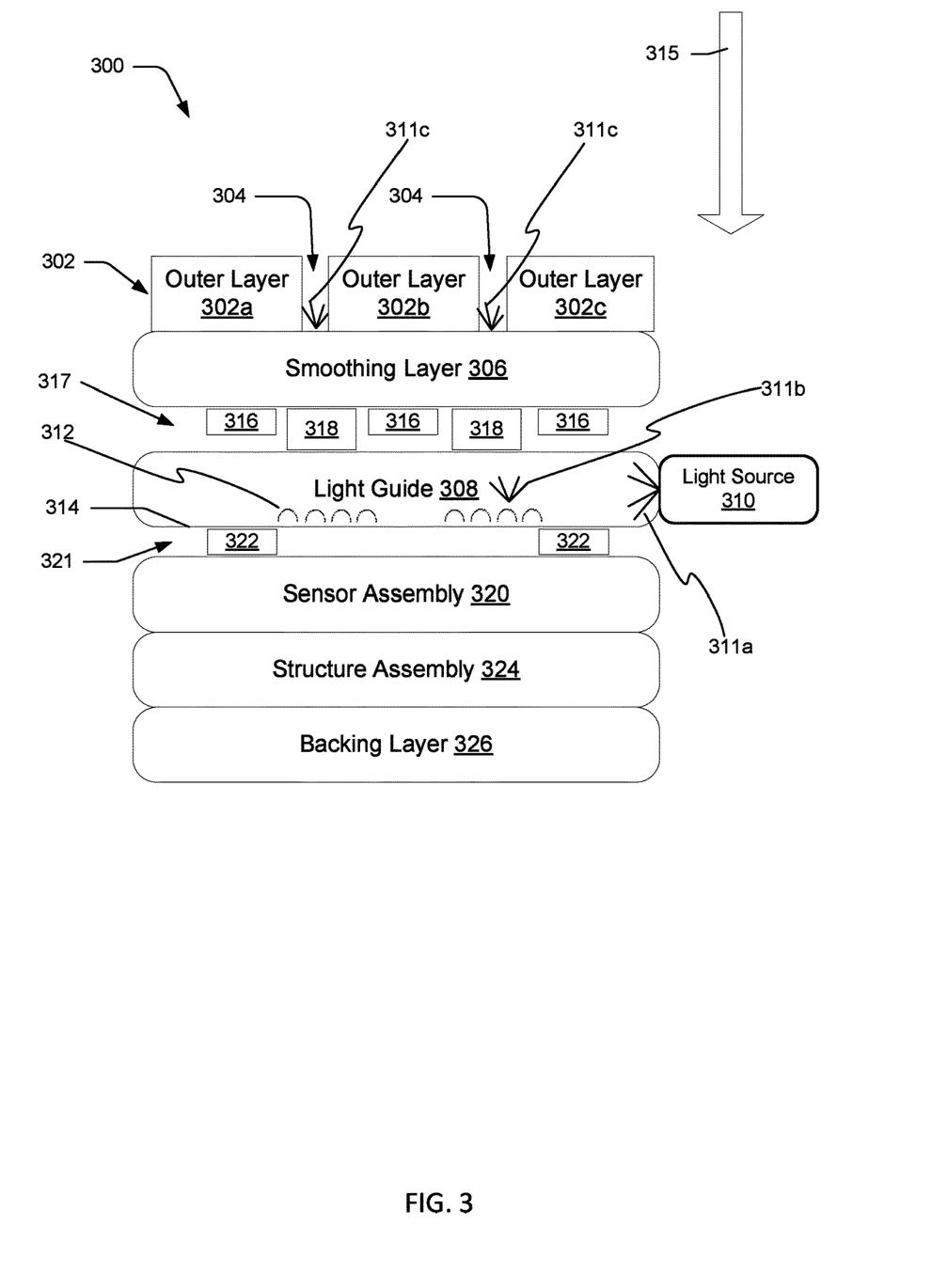
FIG. 3 depicts an example implementation showing a cross section of the backlit device of FIG. 1 including a light guide and a light source.

FIG. 3 depicts an example implementation 300 showing a cross section of device 104 having multiple layers. The outer layer 302 is configured to provide an outer surface of the device 104, which a user may view, touch, interact with, or use to provide input. The outer layer 302 may be formed in a variety of ways.

In certain examples, the outer layer 302 includes a plurality of pieces or outer layer segments (e.g., keys of a QWERTY keyboard) 302a, 302b, 302c. The segments may be affixed to a smoothing layer (discussed below). In other examples, the outer layer 302 is manufactured as a single structure and then etched to carve out or delineate various outer layer segments, inputs, or keys. In some examples, the outer layer 302 is etched with a laser. The laser may etch a fraction of the depth of the outer layer 302, or in some examples, the entire depth of the outer layer 302, therein forming a plurality of individual segments, pieces or keys. The segments of the outer layer 302a, 302b, 302c include openings or gaps 304 between the segments, where light from a light guide may be emitted.

In some examples, each outer layer segment may be etched or heat embossed to define a specific key or function. For example, the segments or keys may be etched or heat embossed to define each key of a QWERTY keyboard.

The outer layer 302 or the outer layer segments 302a, 302b, 302c may be formed from any variety of materials. In one example, the outer layer or outer layer segments are formed from a polymer such as a thermoplastic polymer, a silicone, or a polyurethane. In some examples, the outer layer or segments are formed from a polyurethane laminate, where a cloth fabric is laminated onto a thin film of polyurethane.

Beneath the outer layer 302 is an intermediate smoothing layer 306 configured to support a variety of different functionality in the backlit device 104. For example, the smoothing layer 306 may be configured to cover up or reduce imperfections in an adjacent layer, such as an internal adhesive layer 317 positioned between the smoothing layer and the light guide (e.g., light guide layer). In other words, the continuous surface of the smoothing layer 306 may conceal discontinuities or lateral gaps in the adhesive layer 317 (e.g., between the plurality of adhesive segments 316 and at least one light filter segment 318). In other examples, the smoothing layer 306 may be configured to reduce wrinkling or deformations of the outer layer 302. This may be accomplished based upon adhering the outer layer 302 to the intermediate smoothing layer 306, as opposed to adhering the outer layer 302 to the light guide 308.

In certain examples, the thinness or height of the smoothing layer 306 is 10-200 micrometers (μm), 50-150 μm, or 100-150 μm thin. In one example, the smoothing layer 306 is 125 μm thin.

A light guide 308 is also illustrated in FIG. 3. As mentioned above, the light guide 308 may be connected to or in communication with at least one light source to provide a backlight mechanism and support backlighting of indications (e.g., legends) of outer layer segments of the backlit device 104. This may include illumination of keys of a keyboard, game controls, gesture indications, application-specific indications (e.g., for accounting, graphic design, and CAD design), and other indicators. In certain examples, the thinness or height of the light guide 308 is 10-500 μm, 100-400 μm, or 200-300 μm. In one example, the light guide 308 is 250 μm.

The light guide 308 may be configured in a variety of ways to support transmission of light that is to act as a backlight mechanism 112 for the backlit device 104. The light guide 308 may be configured from a clear plastic or other material that supports transmission of light from a light source 310, which may be implemented using one or more light emitting diodes (LEDs). For example, the light guide 308 may include a clear polycarbonate material.

The light guide 308 may be configured to output light in a specific direction at specific locations through use of microfeatures 312 that assist in redirecting light from the light source. As described herein, microfeatures may refer to etched texturing or protrusions on a surface of the light guide configured to assist in redirecting light from the light source. The microfeatures 312 may be positioned on a light guide surface opposite the outer layer 302, therein redirecting light in the direction of the outer layer 302. For example, as shown in FIG. 3, the light source 310 emits light 311a traveling along the length of the light guide 308. Upon encountering the microfeatures 312, a portion of the light is redirected in the direction of the smoothing layer 306 and outer layer 302 (depicted as redirected light 311b). A portion of the redirected light then passes through light filter segments 318 and is emitted from the device as emitted light 311c in the gaps or openings 304 between the outer layer segments. In some examples, the redirected light may be directed to pass through and illuminate the etched or embossed characters/indicators within an outer layer segment.

In certain examples, the microfeatures 312 may be developed by etching or embossing the light guide surface 314 or by contacting the light guide surface 314 with another material having a different refractive index. In certain examples, the microfeatures 312 of the light guide 308 may be clustered in specific locations on the light guide surface 314 to concentrate the redirection of light in specific areas (e.g., the openings 304 in the outer surface 302). The number of microfeatures 312 within a clustered location may vary based on the distance of the microfeature cluster to the light source 310. For example, a larger number of microfeatures 312 may be required to redirect a targeted light intensity toward the outer surface 302 the farther the location of the microfeatures 312 is to the light source 310.

In certain examples, based on the positioning of the microfeatures 312 on the light guide surface 314, light may be emitted in undesired locations of the outer layer 302. For example, emission of light in undesired locations may provide a galaxy effect (i.e., a ring or halo of light), pinholes, and other undesired light leak formations. Accordingly, one or more of the intermediate layers between the light guide and the outer layer may be configured to reduce and, even prevent, transmission of light in undesirable locations, as depicted in FIG. 3.

As depicted in FIG. 3, a surface of the smoothing layer 306 is affixed to a surface of the light guide 308 via segments of adhesive material 316. The adhesive material 316 may be a non-reactive adhesive such as a pressure-sensitive adhesive (PSA), drying adhesive, or contact adhesive. In one example, the adhesive material 316 is a pressure-sensitive adhesive including an elastomer compounded with a tackifier (e.g., a rosin ester). The elastomer of the PSA may be an acrylic, butyl rubber, ethylene-vinyl acetate, natural rubber, nitrile, silicone rubber, vinyl ether, or styrene block copolymer (e.g., styrene-butadiene-styrene, styrene-ethylene/butylene-styrene, styrene-ethylene/propylene, or styrene-isoprene-styrene). Advantages of such adhesive materials include their ability to apply strong adhesion between adjacent layers while remaining thin and not adding a relatively high amount of weight to the overall device.

In certain examples, segments of the adhesive material 316 are positioned directly beneath corresponding segment (e.g., key) of the outer layer 302 (as viewed in a direction 315 from the outer layer toward the light guide). In other words, the adhesive material 316 is not placed directly beneath the openings 304 in the outer layer 302. This particular positioning of the adhesive material beneath the segments in the outer layer 302 and not beneath the openings 304 in the outer layer 302 allows for improved, more uniform light to be emitted from the light guide through the openings 304 in the outer layer 302 without obstruction, interference, or distortion from the adhesive material 316.

In certain examples, the positioning of the adhesive material 316 in relation to the outer layer 302 is such that the perimeter of an outer layer segment 302a surrounds the perimeter of an adhesive material segment 316 as viewed in the direction 315 from the outer layer to the light guide, perpendicular to a surface of the outer layer. In such an arrangement, each edge of an adhesive material segment 316 is offset or laterally displaced from a respective edge an outer layer segment. That is, the edge of an adhesive material segment is not positioned directly beneath the edge of a segment of the outer layer 302. Instead, the edge of the adhesive material 316 is positioned inward from the edge of an outer layer segment (e.g., segment 302a) and away from the opening 304. For example, an edge of a segment of adhesive material 316 may be laterally displaced or internally offset from the edge of the outer layer segment by at least 10 μm, 20 μm, 50 μm, 100 μm, 200 μm, 300 μm, 400 μm, 500 μm, 1 mm, 1.25 mm, 1.5 mm, 1.75 mm, or 2 mm. In one particular example, the edge of the segment of adhesive material 316 is displaced from the edge of the outer layer segment by 1.25 mm. This particular lateral displacement of each adhesive material segment allows for an improved reduction in undesired light leaks through an opening in the outer later. Specifically, because the adhesive material may transmit light, displacing the material from the edge of an opening in an outer layer segment may prevent undesired light from escaping into the opening and affect the uniformity of the backlighting within the opening.

In other examples, the width, length, perimeter, radius, or circumference of a segment (or segments) of adhesive material 316 positioned beneath an outer layer segment 302a is less than the corresponding width, length, perimeter, radius, or circumference of the outer layer segment 302a such that an outer layer segment surrounds a corresponding adhesive material segment (as viewed in the direction 315 from the outer layer to the light guide). These particular examples regarding width and offset location are discussed in greater detail below with reference to FIG. 4.

In certain examples, the location of a segment of adhesive material 316 is also laterally displaced or offset from the location of the microfeatures 312 on the opposite surface of the light guide 308. In other words, a segment of adhesive material 316 is not positioned directly above the microfeatures 312 on the surface of the light guide 308 (as viewed in the direction 315 from the outer layer to the light guide). Such an arrangement may provide less distortion in the path of the emitted light from the light source toward the outer layer 302 as the redirected light 311b from the microfeatures 312 travels in a path unobstructed by adhesive segments 316. In other words, the adhesive material 316 may change the path of the redirected light 311b or make the light guide locally bright around the adhesive material 316 if the adhesive material 316 is positioned directly above the microfeatures 312 on the surface of the light guide 308. By offsetting or laterally displacing the location of the adhesive material 316 from the microfeatures 312, such light distortion may be avoided.

In certain examples, in addition to the adhesive material 316, the area between the smoothing layer 306 and the light guide 308 may include light filter segments 318. The light filter segments 318 may include a colored printing or paint material having an oil-based or latex composition configured to control the intensity and filter the color of light emitted from the light guide in the direction of the outer layer 302. As shown in FIG. 3, the light filter segments 318 may be positioned beneath areas or openings 304 located between the segments of the outer layer 302. In other words, each light filter segment 318 is positioned along a respective axis running between a respective opening 304 in the outer layer and the light guide 308, the axis being perpendicular to the surface of the outer layer 302. Based on manufacturing tolerances, the edge of each light filter segment may be designed to extend beyond the lateral edge of each opening 304 in the outer layer 302, forming an overlap of the outer layer segment and the light filter segment. In certain examples, the amount of the overlap on each edge between the outer layer segment and the light filter segment is approximately 10 µm, 20 µm, 50 µm, 100 µm, 200 µm, 300 µm, 400 µm, 500 µm, or 1 mm.

Alternatively, the overall width of a light filter segment 318 may be greater than the overall width of the corresponding opening 304 in between segments of the outer layer 302. In certain examples, the width of the light filter segment 318 is greater than the width of the corresponding opening 304 by at least 10 µm, 20 µm, 50 µm, 100 µm, 200 µm, 300 µm, 400 µm, 500 µm, 1 mm, 1.25 mm, 1.5 mm, 1.75 mm, or 2 mm.

Light filter segments 318 may abut adjacent adhesive material segments 316 in the adhesive layer 317. In alternative examples, an opening or gap exists between the edge of the segment of adhesive material and the edge of an adjacent light filter segment 318.

The thinness of the light filter segment 318 is configured with a thinness to provide a color and brightness or intensity of light from the light guide while preventing undesired light from seeping or being emitted into the sides or periphery of the light filter segment 318. The thinness or height of the light filter segment 318 may be configured to provide a predetermined or desired color and brightness or intensity of light in the corresponding opening as observed at the surface of the outer layer in a direction from the outer layer to the light guide perpendicular to the surface of the outer layer. In other words, the thinness of the light filter segment 318 is a variable that may be adjusted to provide a balance between the color of the emitted light and the brightness or intensity of the light. In one example, as the light filter segment 318 (e.g., paint segment) becomes thicker or taller in height, the brightness or intensity of light may be affected, wherein a light box may develop such that a larger amount of undesired light enters the light filter segment 318 from the sides of the segment perpendicular to the light guide 318. This light box effect may create brighter areas around the periphery of the light filter segment 318 and darker areas in the middle of the light filter segment 318. Therefore, it is desirable to reduce the height or thickness of the light filter segment 318 layer to reduce the possibility of a light box effect and any undesirable artifacts that a light box effect would generate. In certain examples, the light filter segment 318 is configured to provide backlighting without a visible light box effect.

The brightness or the luminous emittance of the backlighting through an opening or gap 304 in the outer layer 302 may be determined by an end user's visual inspection of the backlighting. In certain examples, the backlighting may be determined by measuring the luminous emittance of various areas of the opening or gap 304 with a lux meter at the surface of the outer layer.

In some examples, the emitted light through an opening in the outer layer may be considered to be substantially uniform if the variation between the brightest lit location and the dimmest lit location (e.g., as measured by the lux meter at a plurality of locations at the surface of the outer layer) is within a certain threshold. For instance, the emitted backlight is considered substantially uniform within an opening if the variation between the brightest and dimmest locations is less than 20%, 10%, 5%, or 1%. In certain examples, in order to achieve a substantially uniform brightness through the opening or gap in the outer layer, the height or thinness of the light filter segment 318 is less than 40 µm, less than 30 µm, less than 25 µm, less than 20 µm, less than 15 µm, or less than 10 µm. In other examples, the thinness of the light filter segment 318 is 0.1-40 µm, 1-30 µm, or 5-25 µm.

In certain examples, the height or thinness of the light filter segment 318 and the height of the adhesive material 316 are approximately the same. For example, the height of the light filter segment 318 may be within 25%, 20%, 15%, 10%, 5%, or 1% of the height of the adhesive material 316.

Alternatively, or additionally, an implementation may include a light filter segment positioned beneath the light guide 308 (such as between the light guide 318 and sensor assembly 320). Backlighting may be desired in more than one direction (e.g., through openings in the outer layer 302 as well as through a rear outer layer or backing layer). In such examples, the light filter segment located between the light guide and sensor assembly may control the color and intensity of light emitted from the rear outer layer of the device while preventing undesired light from seeping or being emitted into the sides or periphery of the light filter segment.

A sensor assembly 320 is also depicted in FIG. 3. As illustrated, the light guide 308 and the smoothing layer 306 are disposed between the outer layer 302 and the sensor assembly 320. The sensor assembly 320 is configured detect proximity of an object to initiate an input. The detected input may then be communicated to the computing device 102 (e.g., via the connection portion 202) to initiate one or more operations of the computing device 102. The sensor assembly 320 may be configured in a variety of ways to detect proximity of inputs, such as a capacitive sensor array, a plurality of pressure sensitive sensors (e.g., membrane switches using a pressure sensitive ink), mechanical switches, optical sensors, other input sensing mechanisms, or a combination thereof. In one example, sensor assembly 320 is a printed circuit board that includes a layer of force-sensing material that may detect pressure applied to outer layer 320 by a user. The sensor assembly 320 may further include various electronic components and circuits to detect and process user input. In this manner, example implementation 300 may be configured as force-sensing keyboard.

The surface of the light guide 308 furthest from the outer layer 302 may be affixed to the sensor assembly 320 via segments of adhesive material 322 of an adhesive layer 321. The adhesive material 322 may be a similar non-reactive adhesive such as described above for the adhesive material 316 between the smoothing layer 306 and light guide 308. For example, the adhesive material 322 may be a pressure-sensitive adhesive (PSA), drying adhesive, or contact adhesive. In some examples, the adhesive material 322 is a pressure-sensitive adhesive including an elastomer compounded with a tackifier (e.g., a rosin ester), where the elastomer is an acrylic, butyl rubber, ethylene-vinyl acetate, natural rubber, nitrile, silicone rubber, vinyl ether, or styrene block copolymer (e.g., styrene-butadiene-styrene, styrene-ethylene/butylene-styrene, styrene-ethylene/propylene, or styrene-isoprene-styrene). Advantages of such adhesive materials include their ability to apply strong adhesion between adjacent layers while remaining thin and not adding much weight to the overall device.

In certain examples, segments of the adhesive material 322 are positioned directly beneath corresponding segments 302a, 302b, 302c (e.g., keys) of the outer layer 302. The segments of adhesive material 322 may be positioned in similar locations beneath the outer layer 302 as the adhesive material 316 located between the smoothing layer 306 and the light guide 308. In some examples, segments of adhesive material 322 below the light guide 308 are aligned with segments of adhesive material 316 above the light guide 308, such that the segments of adhesive material 316, 322 are aligned on an axis perpendicular to the surface of the outer layer 302 and the layers of the backlit device 104.

In some examples, the location of a segment of adhesive material 322 is laterally displaced or offset from the location of the microfeatures 312 on the adjacent surface of the light guide 308. In other words, adhesive material 322 is not positioned directly beneath locations of microfeatures 312 on the surface of the light guide 308. Such an arrangement may provide less distortion in the path of the emitted light from the light source toward the outer layer 302. In other words, the adhesive material 322 may change the path of the redirected light 311b if the adhesive material 322 is positioned beneath the microfeatures 312 on the surface of the light guide 308. By offsetting or laterally displacing the location of the adhesive material 322 from the microfeatures 312, such light distortion may be avoided.

A structure assembly 324 is also illustrated in FIG. 3. The structure assembly 324 may be configured in a variety of ways, such as a printed circuit board or a rigid material configured to provide rigidity to the backlit device 104 (e.g., resistance to bending and flexing).

A backing layer 326 is also illustrated as providing a rear surface to the backlit device 104. The backing layer 326, for instance, may be formed from one or more sub-layers of polymer material similar to the polymer materials provided in the outer layer 302. For example, the backing layer 326 may be formed from polymers such as thermoplastic polymers, silicones, or polyurethanes. In some examples, the backing layer 326 is formed from a polyurethane laminate, where a cloth fabric is laminated onto a thin film of polyurethane.

Although examples of layers have been described, an example device may omit one or more of the layers described above, or may include one or more additional layers. For example, a dedicated force concentrator layer and/or a mechanical switch layer may be included in the device. Thus, the following discussion of layer examples is not limited to incorporation of the layers in example implementation 300. Additionally, the example implementation 300 is not limiting of the following layer example discussion.

Figure 4:
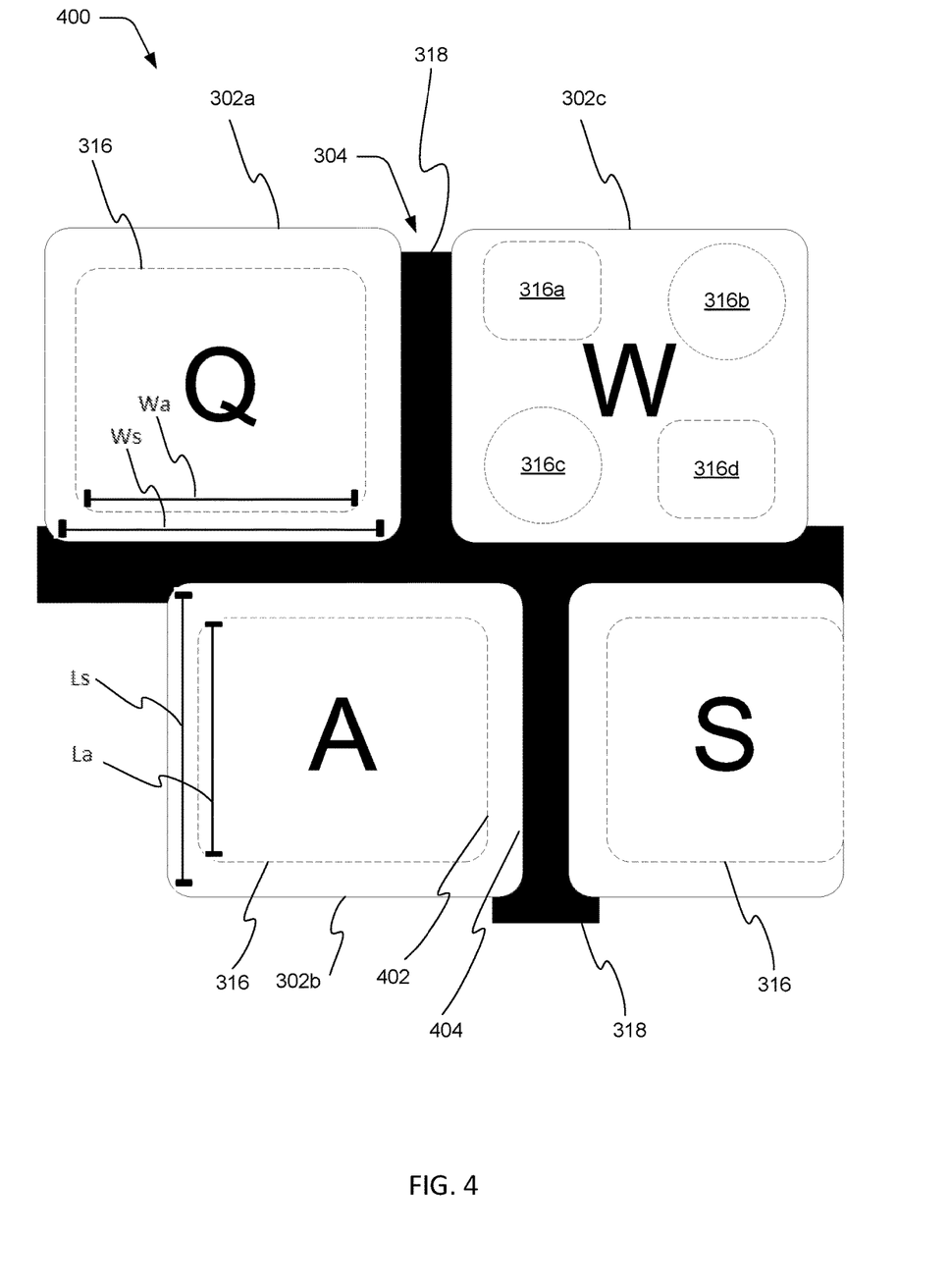
FIG. 4 depicts an example implementation showing a perspective view of a portion of an outer layer and elements of underlying layers of FIG. 3.

FIG. 4 depicts an example implementation 400 showing a perspective view of a portion of the outer layer 302 and elements of underlying layers of FIG. 3. In this example, the outer layer 302 includes a plurality of keys of a QWERTY keyboard 302a, 302b, 302c affixed to a smoothing layer. The outer layer segments 302a, 302b, 302c include openings or gaps 304 between the individual segments, where light from a light guide may be emitted.

As discussed in the example of FIG. 3, the outer layer segments 302a, 302b, 302c are affixed to a smoothing layer 306, wherein the smoothing layer is affixed to a light guide via segments of adhesive material 316. In FIG. 4, the location of the adhesive material 316 is depicted in dashed lines beneath the outer layer segments 302a, 302b, 302c. The location of the adhesive material beneath a segment is not necessarily uniformly positioned throughout the enclosed dashed area. Instead, in certain examples, the location of adhesive material may be positioned in multiple areas 316a, 316b, 316c, 316d beneath the outer layer segment 302c.

As shown in FIG. 4, the segments of adhesive material 316 are positioned directly beneath corresponding segments of the outer layer 302. In this example, the positioning of a segment of adhesive material 316 is beneath an outer layer segment 302a, 302b, 302c such that the perimeter of the adhesive material segment 316 is surrounded by the perimeter of the outer layer segment (as viewed in FIG. 4, which corresponds with the direction from the outer layer toward the underlying light guide). That is, no portion of the adhesive material segment edge 402 is positioned beneath an opening 304 in the outer layer 302. Instead, an edge 402 of the adhesive material 316 is positioned inward or laterally displaced from a corresponding edge 404 of an outer layer segment 302b. For example, the adhesive material edge 402 may be internally offset or laterally displaced from the corresponding outer layer segment edge 404 by at least 0.1 mm, 0.2 mm, 0.3 mm, 0.4 mm, 0.5 mm, 0.75 mm, 1 mm, 1.25 mm, 1.5 mm, 1.75 mm, or 2 mm. As mentioned above, this particular lateral displacement of the adhesive material segments from each edge of the outer layer segment allows for an improved reduction in undesired light leaks through an opening in the outer later. Specifically, because the adhesive material may transmit light, displacing the material from the edge of an opening in an outer layer segment may prevent undesired light from escaping into the opening and affect the uniformity of the backlighting within the opening.

In other examples, the width of a segment Wa of adhesive material 316 positioned beneath an outer layer segment 302a is less than the corresponding width Ws of the outer layer segment 302a. Additionally, the length of a segment La of adhesive material 316 positioned beneath an outer layer segment 302b is less than the corresponding length Ls of the outer layer segment 302b.

FIG. 4 also depicts light filter segments 318 positioned beneath the openings 304 between the outer layer segments 302a, 302b, 302c. As shown in FIG. 4, the width of the light filter segment 318 is greater than the width of the corresponding opening 304 between the outer layer segments 302a, 302b, 302c. In certain examples, the width of the light filter segment 318 is greater than the width of the corresponding opening 304 by at least 0.1 mm, 0.2 mm, 0.3 mm, 0.4 mm, 0.5 mm, 0.75 mm, 1 mm, 1.25 mm, 1.5 mm, or 2 mm.

In certain examples, the positioning of each adhesive material segment may also be laterally displaced from any characters or indicators on the surface of the outer layer segment. For example, as depicted in outer layer segment 302c of FIG. 4, the adhesive material segments 316a, 316b, 316c, and 316d are positioned beneath outer layer segment 302c such that the perimeter of outer layer segment 302c surrounds each adhesive material segment 316a, 316b, 316c, and 316d. Additionally, the character/indicator "W" is positioned such that none of the adhesive material segments are directly below the character. That is, each adhesive material segment is laterally displaced from the character/indicator of the outer layer segment such that backlighting of an etched or embossed character/indicator is possible without distortion or interference from intermediate adhesive material.

Figure 5:
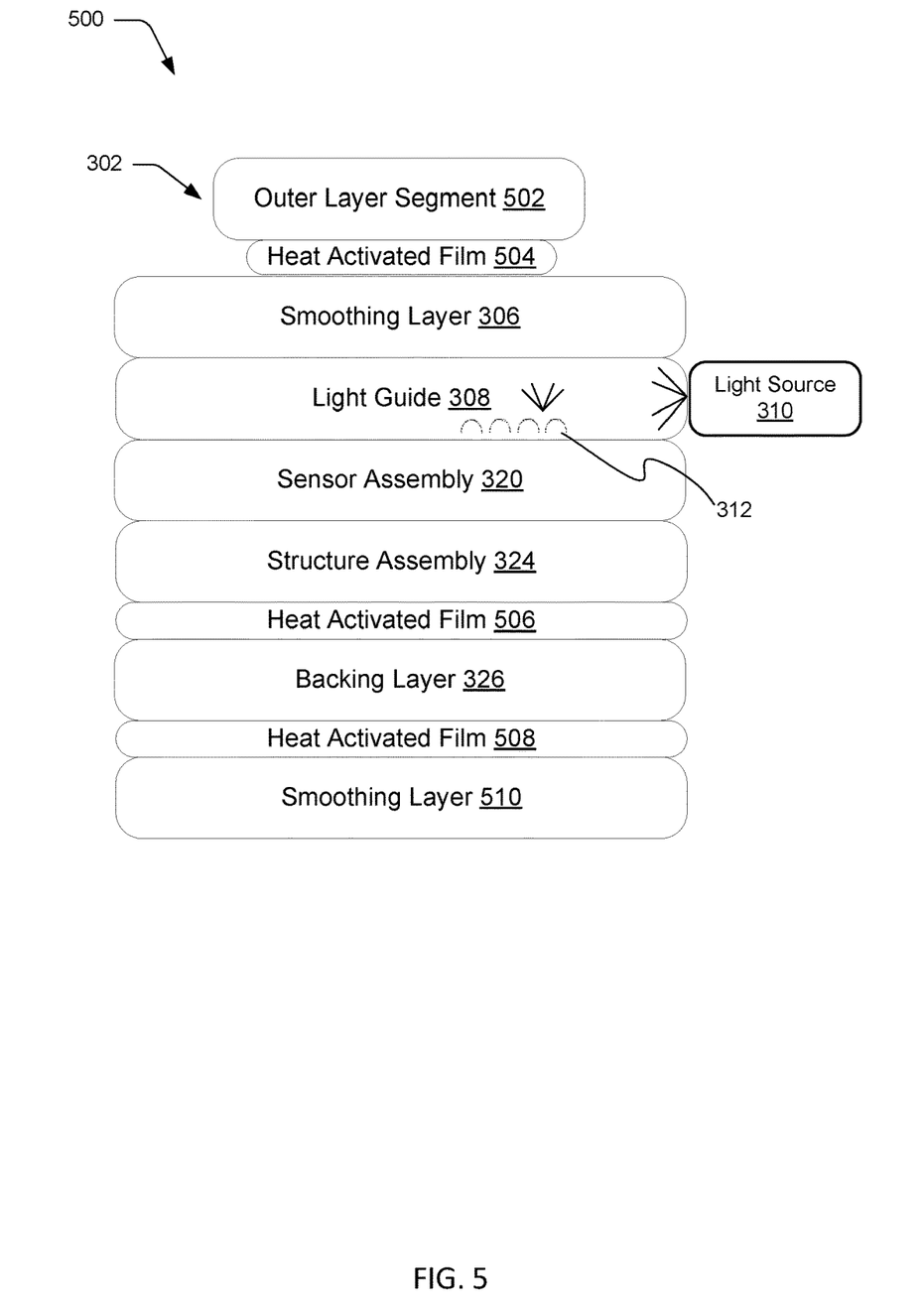
FIG. 5 depicts an example implementation showing a cross section of the backlit device of FIG. 1.

FIG. 5 depicts an additional example implementation 500 showing a cross section of backlit device 104 of FIG. 1. In this example, the outer layer 302 includes at least one outer layer segment 502 configured to supply an outer surface of the backlit device 104 with which a user may touch and interact. The outer layer segment 502 is affixed to a first adhesive layer segment 504 connected to a first smoothing layer 306. The smoothing layer 306 is in communication with a light guide 308, followed by a sensor assembly 320 and structure assembly 324. A second adhesive layer segment 506 is positioned between the structure assembly 324 and a backing layer 326. A third adhesive layer segment 508 is positioned between the backing layer 326 and a second smoothing layer 510. The various layers may be connected with each other in various examples, such as those discussed above with FIGS. 3 and 4.

The outer layer segment 502 in FIG. 5 may be a backlit device segment such as a track pad. Such an outer layer segment 502 may have different desired properties than outer layer segments 302a, 302b, 302c (e.g., QWERTY keys) discussed in FIGS. 3 and 4. In this example, the outer layer segment 502 may require different illumination properties that the outer layer segments 302a, 302b, 302c. For example, the outer layer segment 502 may require some portion of the area to have an enhanced reduction of backlighting, or a complete elimination of backlighting.

The first adhesive layer segment 504 may be positioned between a portion of the outer layer segment 502 and the light guide 308. In one example, as shown in FIG. 5, the first adhesive layer segment 504 may be positioned between the outer layer segment 502 and the smoothing layer 306 of the backlit device. In another example (not depicted), the adhesive layer segment is positioned between the smoothing layer and the light guide 308.

In order for the redirected light from the light guide 308 to be effectively reduced or blocked entirely, the first adhesive layer segment 504 may be a dark color capable of blocking the majority of light from the light guide 308 in the designated location of the adhesive layer. In certain examples, the color of the first adhesive layer segment 504 is black. One advantage of the adhesive layer being black is that it is capable of absorbing more light than other colors, making the black material better for the purpose of restricting or eliminating light emission from designated areas of the device.

In certain examples, the thinness of the first HAF layer segment 504 is 1 μm-1 mm, 10-100 μm, or 20-50 μm. In one particular examples, the thinness of the first HAF layer 504 is 25 μm.

In this example, for the desired backlit properties, a first adhesive layer segment 504 may be a heat activated film (HAF) layer. A heat activated film functions through the introduction of heat and application of pressure during the manufacturing process, wherein the heat and pressure activate polymers within the HAF to bond two opposing layers together. Non-limiting examples of HAF compositions include thermoplastic adhesives such as polyurethanes, nylons/polyamides, polyesters, and polyolefins. Commercial examples are available from companies such as Bemis Associates Inc. (Shirley, Mass., USA) or Tesa SE (Hamburg, Germany).

In certain examples, it may be desirable to have the border of the outer layer segment 502 backlit with redirected light from the light source 310. For example, it may be desirable to provide a track pad on a backlit device 104 with an illuminated border, while reducing or eliminating backlight from the center of the track pad or outer layer segment 502. Therefore, in certain examples, the width, length, perimeter, radius, or circumference dimensions of the first adhesive (e.g., HAF) layer segment 504 positioned beneath the outer layer segment 502 is less than the corresponding width, length, perimeter, radius, or circumference dimensions of the outer layer segment 502. As depicted in FIG. 5, one dimension (e.g., a width) of the first adhesive layer segment 504 is less than the corresponding dimension of the outer layer segment 502.

While the emitted light from the light source 310 is designed to be redirected in the direction of the outer layer 302 and the outer layer segment 502, undesired light may be redirected toward the backing layer 326 and second smoothing layer 510. It may be undesirable to have areas of light escape out the back of the backlit device 104. Therefore, at least one additional adhesive layer of HAF layer segment may be positioned between the light guide 308 and the smoothing layer 510. In the depicted example of FIG. 5, a second adhesive (e.g., HAF) layer segment 506 is positioned between the structure assembly 324 and the backing layer 326. A third adhesive (e.g., HAF) layer segment 508 is positioned between the backing layer 326 and the smoothing layer 510.

Similar to the first HAF layer 504, the at least one additional HAF layer (e.g., the second HAF layer 506 and the third HAF layer 508) may be formed from thermoplastic adhesives such as polyurethanes, nylons/polyamides, polyesters, and polyolefins. Additionally, the at least one additional HAF layer may be a dark color capable of reflecting or absorbing the majority of light from the light guide 308. In certain examples, the color of the at least one additional HAF layer is black.

In certain examples, the thinness of each additional adhesive layer segment (e.g., the second HAF layer 506 and the third HAF layer 508) is 1 µm-1 mm, 10-100 µm, or 20-50 µm. In one particular example, the thinness of the second HAF layer 506 is 50 µm and the thinness of the third HAF layer 508 is 25 µm.

Claim Support Section

In a first embodiment, a device comprises an outer layer comprising a plurality of outer layer segments and at least one opening positioned between the outer layer segments, each outer layer segment of the plurality of outer layer segments comprising an outer layer segment perimeter; a first adhesive layer comprising a plurality of adhesive material segments, each adhesive material segment comprising an adhesive material segment perimeter; and a light guide, wherein the first adhesive layer is positioned between the outer layer and the light guide, wherein each adhesive material segment of the plurality of adhesive material segments is positioned between an outer layer segment and the light guide such that the outer layer segment perimeter of the respective outer layer segment surrounds the adhesive material segment perimeter of the respective adhesive material segment as viewed in a direction from the outer layer to the light guide perpendicular a surface of the outer layer, and wherein light from the light guide can pass through the at least one opening in the outer layer.

In a second embodiment, with reference to the first embodiment, the device further comprises a second adhesive layer comprising adhesive material; and a sensor assembly comprising a plurality of sensors, wherein the light guide is positioned between the first adhesive layer and the second adhesive layer, wherein the second adhesive layer is positioned between the light guide and the sensor assembly, wherein a surface of the light guide farthest from the outer layer comprises microfeatures configured to redirect light from the light source toward the at least one opening in the outer layer, and wherein placement of the additional adhesive material of the second adhesive layer is laterally displaced from a location of the microfeatures as viewed in the direction from the outer layer to the light guide perpendicular to the surface of the outer layer.

In a third embodiment, with reference to the first or the second embodiment, the first adhesive layer comprises at least one light filter segment positioned beneath the at least one opening in the outer layer as viewed in the direction from the outer layer to the light guide perpendicular to the surface of the outer layer, and the light filter segment has a thinness configured to limit variation in brightness in the at least one opening in the outer layer such that the variation is less than 10% between a brightness value of a brightest lit area and a brightness value of a dimmest lit area in the at least one opening as measured by a lux meter at a surface of the outer layer in the direction from the outer layer to the light guide perpendicular to the surface of the outer layer.

In a fourth embodiment, an apparatus comprises a backlit device; and an input/output module comprising a display device, the input/output module configured to process an input from the backlit device and render an output on the display device, wherein the backlit device comprises an outer layer comprising a plurality of outer layer input keys and at least one opening positioned between the outer layer input keys, each outer layer input key of the plurality of outer layer input keys comprising an outer layer segment perimeter; an adhesive layer comprising a plurality of adhesive material segments, each adhesive material segment comprising an adhesive material segment perimeter; a light guide; and a sensor assembly comprising a plurality of sensors, wherein the adhesive layer is positioned between the outer layer and the light guide, wherein the light guide is positioned between the adhesive layer and the sensor assembly, wherein each adhesive material segment of the plurality of adhesive material segments is positioned between the outer layer and the light guide such that the outer layer segment perimeter of the respective outer layer input key surrounds the adhesive material segment perimeter of the respective adhesive material segment as viewed in a direction from the outer layer to the light guide perpendicular to a surface of the outer layer, and wherein light from the light guide can pass through the at least one opening in the outer layer.

In a fifth embodiment, with reference to any of embodiments 1-4, each edge of the adhesive material is positioned at least 0.5 mm from a corresponding edge of a segment of the outer layer adjacent to the opening.

In a sixth embodiment, a device comprises an outer layer comprising a plurality of outer layer segments and at least one opening positioned between the outer layer segments; an intermediate layer comprising at least one light filter segment; and a light guide, wherein the intermediate layer is positioned between the light guide and the outer layer, wherein the light filter segment is positioned along an axis between the opening and the light guide, the axis being perpendicular to a surface of the outer layer, and wherein the light filter segment has a thinness configured to provide a brightness in the opening in the outer layer as observed at the surface of the outer layer in the direction from the outer layer to the light guide perpendicular to the surface of the outer layer.

In a seventh embodiment, with reference to the sixth embodiment, the brightness is observed by a lux meter at a plurality of locations within the opening, and a variation in the brightness is less than 10% as observed between a brightest lit location of the plurality of locations and a dimmest lit location of the plurality of locations.

In an eighth embodiment, with reference to any of embodiments 3, 6, or 7, the thinness of each light filter segment is between 0.1 micrometers and 40 micrometers.

In a ninth embodiment, with reference to any of embodiments 1-8, the device further comprises a first black heat activated film layer configured to block light from the light guide, wherein the first black heat activated film layer is positioned between at least one segment of the outer layer and the light guide.

In a tenth embodiment, with reference to the ninth embodiment, the device further comprises a second black heat activated film layer configured to block light from the light guide, wherein the sensor assembly is positioned between the light guide and the second black heat activated film layer.

In an eleventh embodiment, with reference to the tenth embodiment, the device further comprises a third black heat activated film layer configured to block light from the light guide, wherein the second black heat activated film layer is positioned between the sensor assembly and the third black heat activated layer.

In a twelfth embodiment, with reference to any of embodiments 1-11, the device further comprises a smoothing layer configured as a support layer to reduce wrinkling of the outer layer, wherein the smoothing layer is positioned between the outer layer and the light guide, and wherein the first adhesive layer or intermediate layer is positioned between the smoothing layer and the light guide.

What is claimed is:

1. A device comprising:
   an outer layer comprising a plurality of outer layer segments and at least one opening positioned between the outer layer segments, each outer layer segment of the plurality of outer layer segments comprising an outer layer segment perimeter;
   a first adhesive layer comprising a plurality of adhesive material segments, each adhesive material segment comprising an adhesive material segment perimeter;
   a second adhesive layer comprising a second adhesive material; and
   a light guide, and
   wherein the first adhesive layer is positioned between the outer layer and the light guide, and the light guide is positioned between the first adhesive layer and the second adhesive layer,
   wherein each adhesive material segment of the plurality of adhesive material segments is positioned between an outer layer segment and the light guide such that the outer layer segment perimeter of the respective outer layer segment surrounds the adhesive material segment perimeter of the respective adhesive material segment as viewed in a direction from the outer layer to the light guide perpendicular a surface of the outer layer,
   wherein light from the light guide can pass through the at least one opening in the outer layer,
   wherein a surface of the light guide farthest from the outer layer comprises microfeatures configured to redirect light from a light source toward the at least one opening in the outer layer, and
   wherein placement of the second adhesive material of the second adhesive layer is laterally displaced from a location of the microfeatures as viewed in the direction from the outer layer to the light guide perpendicular to the surface of the outer layer.

2. The device of claim 1, further comprising a sensor assembly comprising a plurality of sensors, wherein the second adhesive layer is positioned between the light guide and the sensor assembly.

3. The device of claim 1, wherein the first adhesive layer comprises at least one light filter segment positioned beneath the at least one opening in the outer layer as viewed in the direction from the outer layer to the light guide perpendicular to the surface of the outer layer,
   wherein the light filter segment has a thinness configured to limit variation in brightness in the at least one opening in the outer layer such that the variation is less than 10% between a brightness value of a brightest lit area and a brightness value of a dimmest lit area in the at least one opening as measured by a lux meter at a surface of the outer layer in the direction from the outer layer to the light guide perpendicular to the surface of the outer layer.

4. The device of claim 1, further comprising:
   a first black heat activated film layer configured to block light from the light guide,
   wherein the first black heat activated film layer is positioned between at least one segment of the outer layer and the light guide.

5. The device of claim 4, further comprising:
   a second black heat activated film layer configured to block light from the light guide, and
   a sensor assembly comprising a plurality of sensors, wherein the second adhesive layer is positioned between the light guide and the sensor assembly, and the sensor assembly is positioned between the light guide and the second black heat activated film layer.

6. The device of claim 1, further comprising:
   a first black heat activated film layer configured to block light from the light guide,
   wherein the first black heat activated film layer is positioned between at least one segment of the outer layer and the light guide.

7. The device of claim 6, further comprising:
   a second black heat activated film layer configured to block light from the light guide, and
   a sensor assembly comprising a plurality of sensors,
   wherein the second adhesive layer is positioned between the light guide and the sensor assembly, and the sensor assembly is positioned between the light guide and the second black heat activated film layer.

8. The device of claim 7, further comprising:
   a third black heat activated film layer configured to block light from the light guide,
   wherein the second black heat activated film layer is positioned between the sensor assembly and the third black heat activated layer.

9. The device of claim 1, wherein each edge of the adhesive material is positioned at least 0.5 mm from a corresponding edge of a segment of the outer layer adjacent to the opening.

10. The device of claim 1, further comprising:
    a smoothing layer configured as a support layer to reduce wrinkling of the outer layer,
    wherein the smoothing layer is positioned between the outer layer and the light guide, and
    wherein the first adhesive layer is positioned between the smoothing layer and the light guide.

11. The device of claim 10, wherein a thinness of the light guide is between 10 and 500 micrometers.

12. A device comprising:
    an outer layer comprising a plurality of outer layer segments and at least one opening positioned between the outer layer segments;
    an intermediate layer comprising at least one light filter segment and at least one first adhesive material segment;
    a second adhesive layer comprising a second adhesive material; and
    a light guide,
    wherein the intermediate layer is positioned between the light guide and the outer layer,
    wherein the light guide is positioned between the first adhesive material segment and the second adhesive layer,
    wherein a surface of the light guide farthest from the outer layer comprises microfeatures configured to redirect light from a light source toward the at least one opening in the outer layer,
    wherein placement of the second adhesive material of the second adhesive layer is laterally displaced from a location of the microfeatures as viewed in the direction from the outer layer to the light guide perpendicular to the surface of the outer layer,
    wherein the light filter segment is positioned along an axis between the opening and the light guide, the axis being perpendicular to a surface of the outer layer, and
    wherein the light filter segment has a thinness configured to provide a brightness in the opening in the outer layer as observed at the surface of the outer layer in the direction from the outer layer to the light guide perpendicular to the surface of the outer layer.

13. The device of claim 12, wherein the brightness is observed by a lux meter at a plurality of locations within the opening, and
    wherein a variation in the brightness is less than 10% as observed between a brightest lit location of the plurality of locations and a dimmest lit location of the plurality of locations.

14. The device of claim 12, wherein the thinness of each light filter segment is 0.1-40 micrometers.

15. The device of claim 12, further comprising:
    a first black heat activated film layer configured to block light from the light guide,
    wherein the first black heat activated film layer is positioned between at least one segment of the outer layer and the light guide.

16. The device of claim 15, further comprising:
    a second black heat activated film layer configured to block light from the light guide,
    wherein the light guide is positioned between the first black heat activated film layer and the second black heat activated film layer.

17. An apparatus comprising:
    a backlit device; and
    an input/output module comprising a display device, the input/output module configured to process an input from the backlit device and render an output on the display device,
    wherein the backlit device comprises:
        an outer layer comprising a plurality of outer layer input keys and at least one opening positioned between the outer layer input keys, each outer layer input key of the plurality of outer layer input keys comprising an outer layer segment perimeter;
        a first adhesive layer comprising a plurality of adhesive material segments, each adhesive material segment comprising an adhesive material segment perimeter;
        a second adhesive layer comprising a second adhesive material;
        a light guide; and
        a sensor assembly comprising a plurality of sensors,
    wherein the first adhesive layer is positioned between the outer layer and the light guide,
    wherein the light guide is positioned between the first adhesive layer and the second adhesive layer,
    wherein a surface of the light guide farthest from the outer layer comprises microfeatures configured to redirect light from a light source toward the at least one opening in the outer layer,
    wherein placement of the second adhesive material of the second adhesive layer is laterally displaced from a location of the microfeatures as viewed in the direction from the outer layer to the light guide perpendicular to the surface of the outer layer,
    wherein each adhesive material segment of the plurality of adhesive material segments is positioned between the outer layer and the light guide such that the outer layer segment perimeter of the respective outer layer input key surrounds the adhesive material segment perimeter of the respective adhesive material segment as viewed in a direction from the outer layer to the light guide perpendicular to a surface of the outer layer, and
    wherein light from the light guide can pass through the at least one opening in the outer layer.

18. The apparatus of claim 17, wherein the backlit device further comprises:
    a first black heat activated film layer configured to block light from the light guide,
    wherein the first black heat activated film layer is positioned between the outer layer and the light guide.

19. The apparatus of claim 18, wherein the backlit device further comprises:
    a second black heat activated film layer configured to block light from the light guide,
    wherein the sensor assembly is positioned between the light guide and the second black heat activated film layer.

20. The apparatus of claim 19, wherein the backlit device further comprises:
    a third black heat activated film layer configured to block light from the light guide,
    wherein the second black heat activated film layer is positioned between the sensor assembly and the third black heat activated layer.

* * * * *